US012000162B2

(12) United States Patent
Boros et al.

(10) Patent No.: US 12,000,162 B2
(45) Date of Patent: Jun. 4, 2024

(54) PRINTER APPARATUS FOR CREATING A CONCRETE SUPPORT STRUCTURE FOR A PASSENGER TRANSPORT SYSTEM

(71) Applicant: INVENTIO AG, Hergiswil (CH)

(72) Inventors: Csaba Boros, Dunajska Streda (SK); Georg Wagenleitner, Rossleiten (AT)

(73) Assignee: INVENTIO AG, Hergiswil (CH)

( * ) Notice: Subject to any disclaimer, the term of this patent is extended or adjusted under 35 U.S.C. 154(b) by 217 days.

(21) Appl. No.: 17/753,771

(22) PCT Filed: Sep. 1, 2020

(86) PCT No.: PCT/EP2020/074268
§ 371 (c)(1),
(2) Date: Mar. 14, 2022

(87) PCT Pub. No.: WO2021/052743
PCT Pub. Date: Mar. 25, 2021

(65) Prior Publication Data
US 2022/0372777 A1 Nov. 24, 2022

(30) Foreign Application Priority Data
Sep. 16, 2019 (EP) .................................... 19197594

(51) Int. Cl.
*E04G 21/04* (2006.01)
*B33Y 30/00* (2015.01)
(Continued)

(52) U.S. Cl.
CPC .......... *E04G 21/0436* (2013.01); *B33Y 30/00* (2014.12); *E04C 5/012* (2013.01); *E04C 5/073* (2013.01); *E04G 2021/049* (2013.01)

(58) Field of Classification Search
CPC ..... B33Y 30/00; B28B 1/001; E04G 21/0436; E04G 2021/049; E04G 21/0427;
(Continued)

(56) References Cited

U.S. PATENT DOCUMENTS 735,920 A 8/1903 Visintini
2017/0305034 A1* 10/2017 Grivetti .................. B28B 1/001

FOREIGN PATENT DOCUMENTS

CN 206233586 U 6/2017
CN 107190913 A 9/2017
(Continued)

OTHER PUBLICATIONS

International Search Report for International Application No. PCT/EP2020/074268 dated Oct. 23, 2020.

*Primary Examiner* — Jerzi H Moreno Hernandez
(74) *Attorney, Agent, or Firm* — Knobbe, Martens, Olson & Bear, LLP

(57) ABSTRACT

A printer device for creating a concrete support structure of a passenger transport system configured as an escalator or moving walkway in an existing building. The printer device has at least one printer guide device, a 3D concrete printer device, which is arranged so as to be movable along the printer guide device, and a printer controller. The printer guiding device comprises at least one guideway whose guide path can be adjusted at least in the vertical direction in relation to its spatial position of use.

9 Claims, 5 Drawing Sheets

(51) Int. Cl.
*E04C 5/01* (2006.01)
*E04C 5/07* (2006.01)

(58) Field of Classification Search
CPC . E04C 5/012; E04C 5/073; E04C 3/20; E04C 5/205
See application file for complete search history.

(56) References Cited

FOREIGN PATENT DOCUMENTS

| | | | | |
|---|---|---|---|---|
| CN | 108103952 B | | 5/2019 | |
| CN | 107974950 B | * | 6/2019 | ............ E01D 21/00 |
| JP | 2015217682 A | * | 12/2015 | |
| JP | 2015217682 A | | 12/2015 | |
| KR | 20180016100 A | | 2/2018 | |
| WO | WO 2016166116 A1 | | 10/2016 | |
| WO | WO 2018136475 A1 | | 7/2018 | |

* cited by examiner

PRINTER APPARATUS FOR CREATING A CONCRETE SUPPORT STRUCTURE FOR A PASSENGER TRANSPORT SYSTEM

TECHNICAL FIELD

The disclosure relates to a printer device for creating a concrete support structure of a passenger transport system configured as an escalator or moving walkway.

SUMMARY

Passenger transport systems, which are configured as escalators or as moving walkways, are used in buildings in the public sector, for example in train stations, subway stations, airports and in shopping malls, cultural centers and the like. Escalators or moving walkways have a supporting structure, which is referred to as a support structure. Most of the time, this structure is a truss structure, which is manufactured by the manufacturer as a whole unit or divided into structural modules. The support structure or its structural modules or truss modules are built into a building, with the support structure connecting two floors of the building, for example.

In this support structure, the movable components of the escalator or moving walkway are arranged, for example a step belt or a pallet belt, deflecting axes, a drive shaft and the drive motor with gear, its control, monitoring systems, security systems and the like. Furthermore, fixed components such as balustrades, comb plates, bearing points, tracks and guide rails are also firmly connected with the structure. If the structure is subdivided into structural modules, each separation point formed thereby means a considerable increase in material, manufacturing time and assembly time. Therefore, separation points are avoided as far as possible or their number is kept as small as possible, which means that this component with its very large dimensions is transported from the place of manufacture to the place of use. This creates a large transport volume, which causes comparatively high transport costs.

Escalators and moving walks of the aforementioned type or their modules are therefore large, bulky parts which, because of their structure, cannot be inserted into a building in just any way. As mentioned above, the support structure takes up all the components of the escalator and supports them at two opposing support points in the building. In other words, this means that the support structure extends over the entire planned length of the passenger transport system.

In the case of new structures to be created, the escalators and moving walkways are usually used during the construction process as soon as their support points created by the building are available, and then the surrounding walls and ceilings of higher floors are further built. This is because these passenger transportation systems are built into the building as very large components for the aforementioned reasons and are so large that they could only be introduced into the building through existing openings with difficulty.

In existing buildings, however, there is no possibility of introducing a large escalator or moving walkway into the building without breaking out parts of the building envelope, for example walls, and creating openings in order to introduce the large components. This problem can also exist at subway stations because their tunnels are made into the ground and the escalators and moving walkways have to be installed in these tunnels.

Another problem is transporting such passenger transport systems which are completely assembled in the manufacturing plant and delivered as a whole. Large trucks have to be used here, although the large volume of these systems can mean that traffic routes are also blocked during transport and certain traffic obstructions have to be accepted.

In order to avoid the problems listed above, passenger transport systems of the aforementioned type are often introduced into the building in a disassembled state and only assembled there. However, there is the problem here that the support structure, which is usually designed as a truss structure, and which represents the largest part of an escalator or moving walkway, cannot be dismantled arbitrarily. Even if the structure is delivered disassembled in two or three sections and brought into the building, it is still possible that certain parts of the building must be broken out. In addition, each interface of the structure on which the sections are assembled represents a considerable additional effort, since this must be particularly reinforced so that the interface has the same load-bearing capacity as the other parts of the structure.

Because of these problems, the object of the present disclosure can be seen in creating possibilities for introducing a support structure into an existing building or structure without parts of the building having to be broken out or the support structure having to be introduced into the building in sections.

This object is achieved by a printer device for creating a concrete support structure of a passenger transport system configured as an escalator or moving walkway in an existing building. For this purpose, the printer device has at least the components listed below.

The printer device includes a printer guide device, which can be arranged between two support points of the building provided to support the passenger transport system. Here, the printer guide device is designed to be supported, at least during the printing process, on the floors of the building to be connected to the passenger transport system. In other words, the printer guide device is supported, at least during the execution of the printing process, on the floors of the building to be connected to the concrete support structure. The printer guide device is preferably supported in the area of the support points on the building, so that the two support points are bridged to a certain extent by the printer guide device. Because the printer guide device is supported on the floors provided for the connection, it can be aligned directly with the support points without great effort, which leads to a high manufacturing precision of the concrete support structure to be created.

Furthermore, the printer device comprises a 3D concrete printer device, which can be arranged on the printer guide device so as to be movable along it. The 3D concrete printer device is configured to spatially arrange workable concrete. For this purpose, the 3D concrete printer device has at least one printer nozzle, a movement device for moving the printer nozzle, and a printer controller. By means of the printer control, the movement device, the supply of concrete through the printer nozzle, and the movements of the entire 3D concrete printer device along the printer guide device can be controlled. Control software is used for control, which can carry out the printing process while the concrete support structure is being built on the printer controller.

So that the printer guiding device can be installed and used in different buildings, it has at least one guideway, the guiding path of which can be adjusted at least in the vertical direction in relation to its spatial position of use. This means that the printer guide device can be adjusted to the respective support points of a building so that a guide path can be created that guides the 3D concrete printer device between the two support points safely and stably.

As already mentioned at the beginning, the support structure is the largest component of the passenger transport system. With the device according to the disclosure, this largest part can be created directly in the building. As a result, the transport volume of the passenger transport system from the manufacturer's factory to the building in which the passenger transport system is to be installed and operated can be greatly reduced. It also achieves a so-called local production share for domestic companies, which is required for many public contracts. All other components of the passenger transport system can then be installed in the concrete support structure, which further increases the local production share.

So that the at least one guideway can be arranged in a stable manner, the printer guide device has a support structure on which the guideway is arranged or formed. This support structure can have various properties, for example it should be configured to be as bend-proof and torsionally rigid as possible so that the 3D concrete printer device can be guided stably. Furthermore, the support structure can have support devices which can be supported on the building. In addition, adjustment devices can be provided, by means of which the support devices can be adjustably arranged on the support structure, so that the printer guide device or its guideway can be adjusted precisely to the support points of the building and, if appropriate, to other areas of the building such as floors, walls and the like. The guideway (53) is thus essentially adjusted by means of the adjustment of the support structure (57).

In order to take into account differences in level between the support points, or to ensure the height adjustment, the supporting structure can comprise at least two serially connected sections, the central longitudinal axes of which can be adjusted at an angle to one another. These sections can be adjusted in various ways.

In one configuration of the disclosure, the support structure can be adjusted to the two support points by arranging a fixable articulation point between each two sections of the support structure. The articulation point enables the angle to be shifted between the two sections, so that the height can be varied by supporting one end of the support structure, for example, on a lower floor of the building and the other end of the support structure on a higher level of the building.

Alternatively, at least one angular segment can be arranged in each case between two sections of the supporting structure in order to achieve the desired angular adjustment of the sections relative to one another.

In a further embodiment of the disclosure, the guideway can be adjustable relative to the support structure. This has the advantage that fine adjustments do not have to be made via the rather cumbersome support structure, but that fine adjustments can be made to the guideway relative to the support structure.

Simple spindles, but also electromechanical, pneumatic or hydraulic partially or fully automated setting and fine adjustment drives, which can be operated by means of an associated control system and optionally supported by sensors, can be used as adjustment means and fine adjustment means.

As already mentioned above, the support structure is built between the two support points of the building and connects these two if necessary. The entire printer guide device, the entire support structure, but also only a part of the support structure can also be provided, for example, as reinforcement or part of the reinforcement. This means that at least part of the printer guide device is surrounded by concrete during the printing process and then remains in the finished concrete support structure.

The part of the printer guide device remaining in the concrete support structure can have at least one connection point for receiving additional reinforcement material, whereby the additional reinforcement material can be firmly connected to the support structure.

The support structure or the printer guide device can have receiving devices for bearing components at least at one of its two ends. These bearing components serve to ensure suitable bearing of the finished concrete structure in relation to the building. This is particularly important in the case of escalators or moving walkways, which are intended for use in structures which are or are being erected in seismically active areas. The buildings erected in earthquake areas are subject to special building regulations and are specially designed for these loads. In order to avoid damage, movements can take place relative to each other between individual floors of the building in the event of an earthquake. This means that if the support structure were rigidly installed, it would be torn apart if such movements took place. To avoid this, escalators or moving walkways are anchored in the support points in such a way that they allow relative movements at the respective support point. Usually one of these bearings is constructed as a pivot bearing at one bearing point and as a plain bearing at the other bearing point opposite. The bearing components can be integrated into the concrete support structure through the printing process between the concrete support structure and the respective support point. The pivot bearing can be designed in such a way that it enables pivoting movements of the passenger transport system about a vertical axis. The plain bearing at the other support point only supports the passenger transport system against vertical forces at this end, but it can move in all directions on the horizontal plane.

In a further configuration of the disclosure, the receiving device for receiving the bearing components can be moved relative to the support structure and is arranged on said support structure. As a result, the bearing components accommodated therein can be aligned with the respective bearing point.

Using the printer device described above, a method for creating a concrete support structure of a passenger transport system configured as an escalator or moving walkway can be carried out. Here, a printer device for three-dimensional concrete printing is installed in an existing building. The printer device is introduced by arranging a printer guide device of the printer device between two support points of the building provided to support the passenger transport system. A 3D concrete printer device is connected to this printer guide device and is guided displaceably along this printer guide device between the two support points. As soon as the printer device is set up and installed, it can be used to create a concrete support structure which extends between the two support points.

As already mentioned, at least part of the printer guide device can remain as reinforcement or part of the reinforcement in the concrete support structure by arranging it on the support points of the building prior to the printing process and the remaining part of this printer guide device being let into the concrete support structure by the printing process. This means that, for example, the entire printer guide device can form all or part of the reinforcement of the concrete support structure. However, it can also be the case that only part of the printer guide device is enclosed as reinforcement by the concrete during the printing process and only this enclosed part serves as reinforcement of the concrete support structure. In this case, the rest of the printer guide device is separated from the enclosed parts of the printer guide device after printing and can, if necessary, be reused for a further printing process.

However, it may also be the case that no part of the printer guide device is enclosed in the concrete support structure and this is only used to guide the 3D concrete printer device between the two support points. In other words, the printer guide device of the printer device can only remain temporarily between the support points, in that it is aligned with the support points before the printing process when it is arranged in the building and is removed again after the printing process.

As already mentioned, a pivot bearing can be formed at one of the two support locations and a slide bearing at the other support location, possibly including bearing components, during the printing process on the concrete support structure. However, additional components made of steel, for example, are not absolutely necessary. Depending on the printer program, the concrete quality and the specified reinforcement plan, the swivel bearing and the plain bearing can be generated purely by the printing process and the introduction of any reinforcement in the support points.

The method preferably produces a concrete support structure which has a U-shaped cross section which is open at right angles to its longitudinal extent. In other words, such a concrete structure has two side walls which are connected to one another by a floor. The printing process can be used, for example, to form guide elements in the side walls which are used to guide moving components of the passenger transport system. Likewise, receptacles for components of the passenger transport system can also be printed, it being possible for at least one fastening element, preferably made of metal or a polymer material, to be embedded in these receptacles during printing. This fastener can be a bolt, a threaded bolt, a tab, a lever, a rod, an anchor and the like.

If the printer device has a reinforcement feed device, reinforcement material can be fed through it during the printing process. This reinforcement material can be, for example, reinforcement fibers made of steel or plastic. However, it can also be wires which are introduced into the concrete material in a suitable and controlled manner. For this purpose, the reinforcement feed device preferably follows a reinforcement plan, which is implemented in the control software.

As soon as the concrete support structure of the passenger transport system has been created by the printer device, the printer device can be dismantled and after a corresponding setting time, the concrete support structure can be supplemented with the other components of the passenger transport system for the finished, ready-to-use, passenger transport system configured as an escalator or moving walkway.

BRIEF DESCRIPTION OF THE DRAWINGS

Embodiments of the disclosure will be described in the following with reference to the accompanying drawings, although neither the drawings nor the description should be construed as limiting the disclosure. In the drawings.

DETAILED DESCRIPTION

Figure 1:
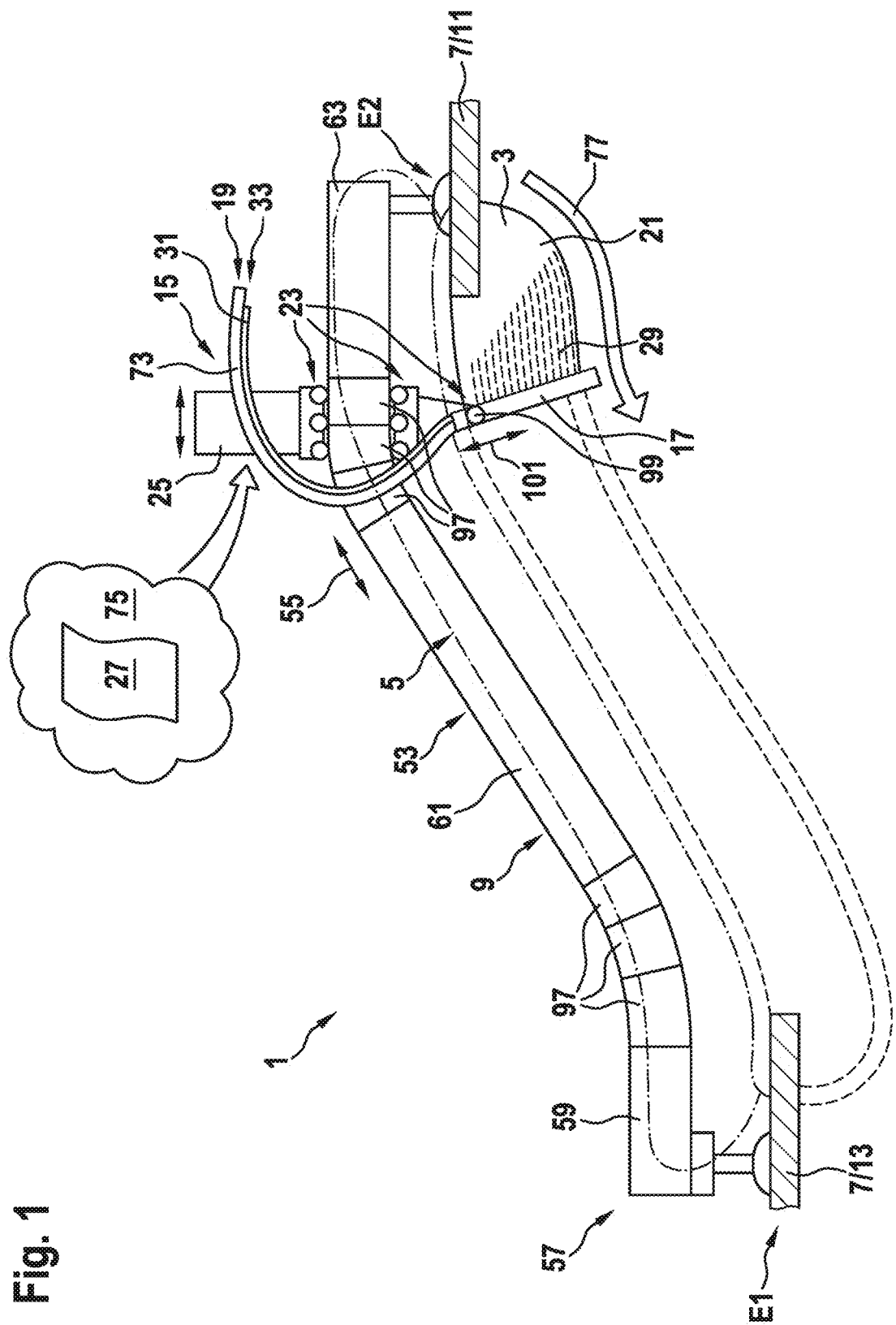
FIG. 1: schematically shows a printer device according to the disclosure with a printer guide device, a 3D concrete printer device and a reinforcement feed device.

FIG. 1 shows a printer device 1 according to the disclosure having a printer guide device 9, a 3D concrete printer device 15 and a reinforcement feed device 31. Furthermore, FIG. 1 shows two floors E1, E2 of a building 7 arranged on different levels, which are to be connected to one another by a passenger transport system 5. This passenger transport system 5 is shown by means of a dash-dotted line because it has not yet been created. In order to create this passenger transport system 5, a load-bearing structure must be inserted between these two floors E1, E2. A concrete support structure 3 is provided as the load-bearing structure.

In order to support this concrete support structure 3 against gravity in the building 7, two bearing points 11, 13 are provided, which are formed by the customer on the superposed floors E1, E2 of the building 7. As FIG. 1 shows, the printer guide device 9 is arranged between the two floors E1, E2 or between the support point 11 of the upper level E2 and the support point 13 of the lower level E1 in order to create the concrete support structure 3 of the passenger transport system 5.

The printer guide device 9 has a support structure 57, on which at least one guideway 53 is formed. The shape of the support structure 57 in the side view shown in FIG. 1 approximately reflects the later course of the longitudinal extension of the concrete support structure 3. For this purpose, the support structure 57 has a first section 59, a second section 61 and a third section 63 which are straight in their longitudinal extent and which can be connected to one another by means of angle segments 97. Depending on the number of angle segments 97 used, the serially connected sections 59, 61, 63 or their central longitudinal axes, not shown, can be set at an angle to one another. In other words, different slopes of the second section 61 can be set by the number of angle segments 97 used. For the fine adjustment of the guideway 53, for example, slightly wedge-shaped intermediate inserts, not shown, can be used, which allow easy correction of the guideway 53 relative to the other parts of the support structure 57.

As already mentioned, the printer device 1 also comprises a 3D concrete printer device 15, which is guided on the printer guide device 9 so as to be displaceable along a guide path 55. The 3D concrete printer device 15 can be moved along the guide path 53 by means of a movement device 23.

The 3D concrete printer device 15 also has a printer nozzle 17. The printer nozzle 17 can be connected to a concrete conveyor 73, through which workable concrete 19 can be fed through a conveyor 73 to the printer nozzle 17.

Of this concrete conveyor 73, only the hose is shown, which is usually connected to a transport vehicle, for example a truck, which has transported the fresh concrete to the construction site. The printer nozzle 17 is also guided movably on the rest of the 3D concrete printer device 15 by means of the movement device 23, represented symbolically by the double arrow 101 and the swivel mechanism 99.

The reinforcement supply device 31 is also connected to the printer nozzle 17, so that reinforcement parts 33 can be supplied. The printer nozzle 17 shown is described in more detail below in connection with FIGS. 5 and 6.

In order to coordinate the movements of the movement device 23 required for the printing process, the printer device 1 has a printer controller 25. The printer controller 25 executes control commands which are implemented in a control software 27. This control software 27 can be downloaded, for example, from a data cloud (cloud) 75. The control software 27 in this case contains all movement sequences both of the 3D printer device 15 relative to the printer guide device 9 and of the printer nozzle 17 relative to the rest of the 3D printer device 15. Furthermore, according to the control software 27, the printer controller 25 controls the supply of workable concrete 19 and reinforcement material 33 to the printer nozzle 17.

As shown in FIG. 1, the printer device 1 is in the middle of the process for creating the concrete support structure 3. Here, the part of the concrete structure 3 that has already been created is shown with a solid line, while the part of the concrete structure 3 that has not yet been created is shown with a broken line. The part of the concrete supporting structure 3 that has already been created shows the already processed concrete 21 and the indicated, already installed reinforcement 29, which was introduced in accordance with the printing process 77 that has already taken place.

Figure 2:
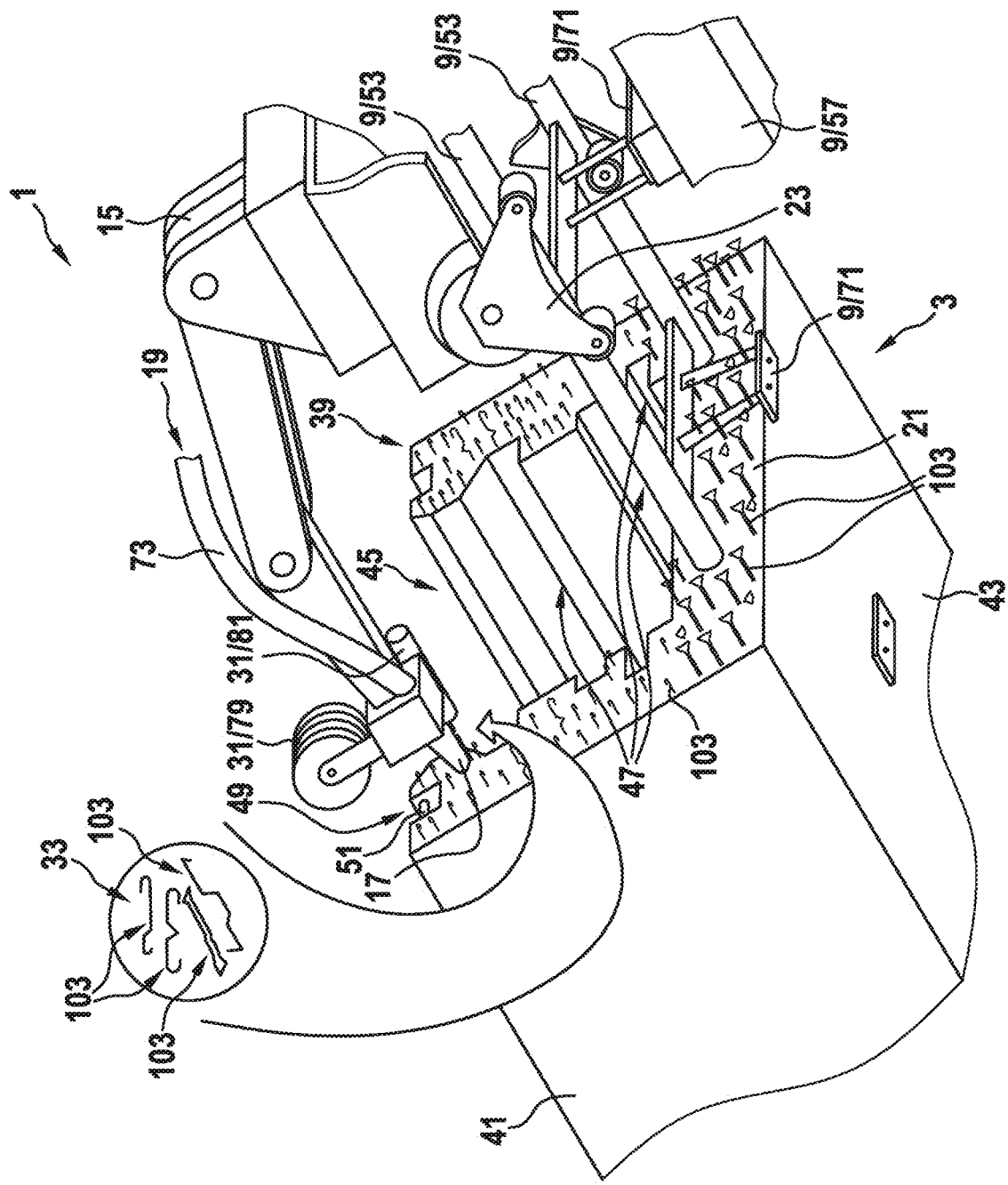
FIG. 2: schematically shows a section of a concrete support structure during the printing process with a printer device.

FIG. 2 shows an alternative configuration of the printer device 1. Their printer guide device 9 has a support structure 57 and two guideways 53, which are connected to the support structure 57 via connection points 71.

A 3D concrete printer device 15 is movably arranged along the guideways on the guideways 53 by means of a movement device. The 3D concrete printer device 15 is a converted industrial robot which is provided with further parts. These further parts are a printer nozzle 17 and a reinforcement feed device 31. The printer nozzle 17 is in turn connected to a concrete conveyor 73.

In contrast to the previous example in FIG. 1, in the example in FIG. 2 the reinforcement material 33 is introduced into the workable concrete 19 not in the form of reinforcement wires, but in the form of reinforcement fibers 103. The reinforcement material 33 in the form of reinforcement fibers 103 is continuously manufactured in the reinforcement feed device 31 from semi-finished material 79. In the present exemplary embodiment, the semi-finished material 79 is wound up as a wire on a wire reel, which is brought into a suitable length and suitable shape by the reinforcement feed device 31. As shown, the reinforcement fibers 103 can take various forms. This has the advantage that the shape and length of the reinforcement fibers 103 can be varied depending on the place of use. After the reinforcement material 33 has been cut to length and formed, it is fed to a shooting device 81 of the reinforcement supply device 31 and this is introduced at the right place and with the right shot energy into the still soft concrete 21 which is applied or processed by the nozzle. Both the movement device 23 and the 3D printer device 15 and the reinforcement feed device 31 are in turn controlled by a printer control (not shown) and the associated control software.

The part of the concrete support structure 3 already produced by the printer device 1 has a U-shaped cross section 45. This is formed by two side walls 41, 39, which are connected to one another by a floor 43. As can be clearly seen, the two guideways 53 of the printer guide device 9 are included in the printing process. After the complete construction of the concrete support structure 3, the rest of the printer guide device 9, namely the support structure 57, can be solved by separating the connection points 71 from the concrete support structure 3. Thus, part of the printer guide device 9 is part of the reinforcement material 33 of the finished concrete structure 3.

A particular advantage of printing the concrete structure 3 is that advantageous configurations of the concrete structure 3 can be printed at the same time. On the one hand, these can be free outer shapes of the floor 43 and the side walls 39, 41, which can be freely shaped according to the wishes of the architect. On the other hand, as shown in the present exemplary embodiment in FIG. 2, function-relevant contours, such as the guide elements 74 shown, can also be printed by the printing process. These guide elements 47 serve as guide rails for the step belt or pallet belt (not shown) of the passenger transport system 5 which can be arranged movably within the concrete support structure 3. Furthermore, receptacles 49 can also be printed. Fastening elements 51 can be embedded in these receptacles 49, to which further components of the passenger transport system 3 can be fastened.

Figure 3:
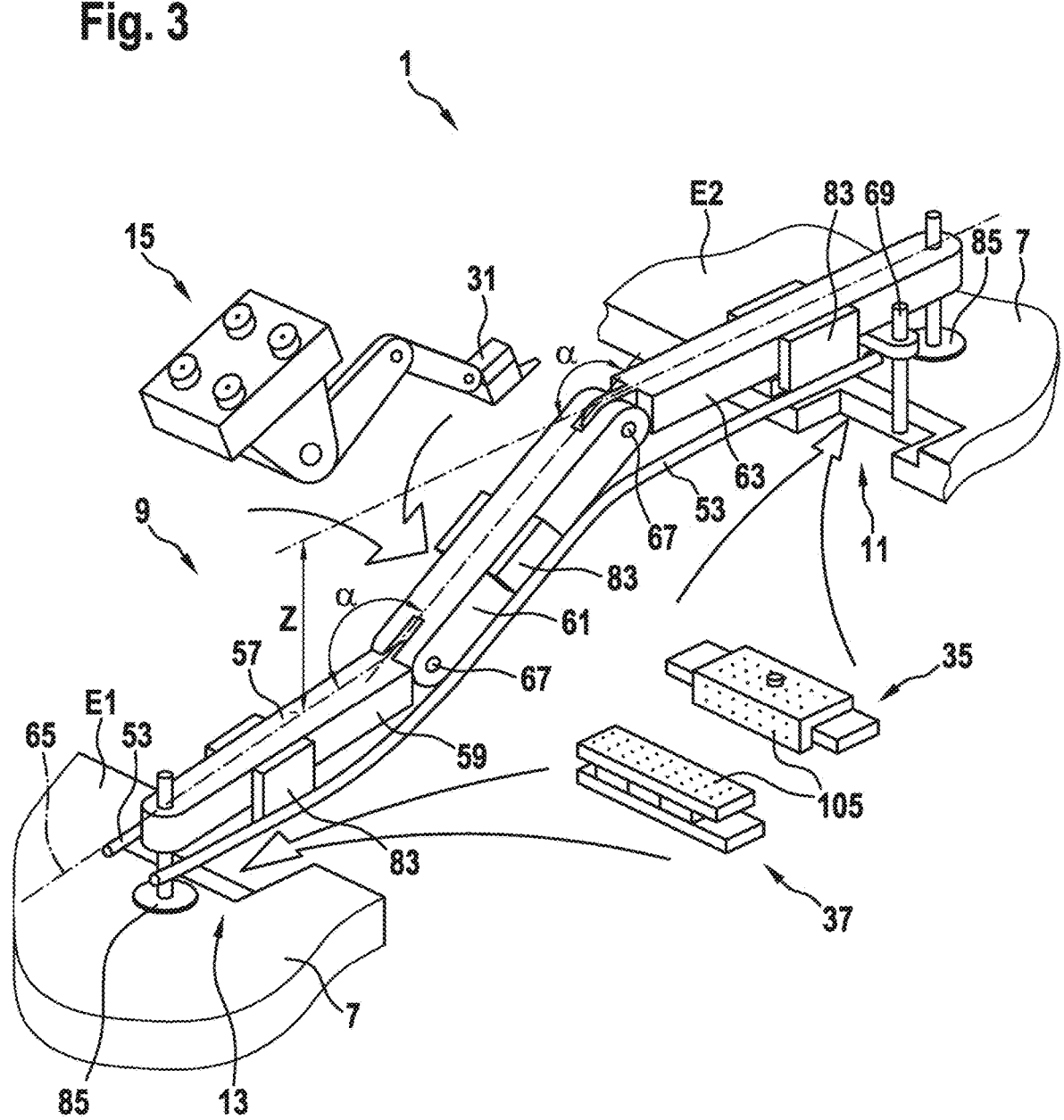
FIG. 3: schematically shows a printer guide device with a 3D concrete printer device that can be connected to it.

FIG. 3 shows a further possible configuration of the printer device 1. Again two floors E1, E2 of the building 7 are shown. A support point 11, 13 is formed on each of these floors E1, E2. A printer guide device 9 of the printer device 1 is arranged between the two support points 13, 11. The printer guide device 9 is used to guide a 3D concrete printer device 15, which is part of the printer device 1 and has already been described in detail in connection with FIG. 2. In contrast to the printer device 1 of FIG. 2, in FIG. 3 the 3D concrete printer device 15 is not guided "standing" but "hanging" on the printer guide device 9.

The printer guide device 9 has three sections 59, 61, 63. The first section 59 has a support 85 which is arranged on the floor E1. The third section 63 also has a support 85 which is supported on the second floor E2 of the building 7. The first section 59 and the third section 63 are connected to one another via articulation points 67 by means of the second section 61. As a result, the level difference between the floor E1 and the floor E2 can be set on the printer guide device 9, as is symbolically represented by the height dimension Z. As is shown by means of the central longitudinal axis of the printer guide device 9, the articulation points 67 enable an angular adjustment a of the second section 61 to the third section 63 and to the first section 59. This support structure of the printer guide device 9, which is formed by the sections 59, 61, 63 and the articulation points 67, supports the two guideways 53, which are adjustably fastened to the support structure 57 by means of adjusting brackets 83.

Furthermore, the printer guide device 9 has a receiving device 69. This holding device 69 is used for the temporary holding of bearing components 35, 37. Here, the bearing component 35 is a pivot bearing, and the bearing component 37 is a plain bearing. By installing the two bearing components 35, 37, the concrete support structure 3 (not shown) may move relative to the two floors E1, E2 after completion. In order to achieve good anchoring of the bearing components 35, 37, these have holes which serve as connection points 105 to reinforcement parts 33, which can be fed by the reinforcement feed device 31 and inserted into these connection points 105.

As can be easily seen in FIG. 3, a printer guide device 9 is shown, which is set up before the printing process and can then be completely dismantled after the concrete support structure 3 has been created. Thus, no part of the printer guide device 9 remains as part of a reinforcement in the concrete support structure 3 that has been created.

Figure 4:
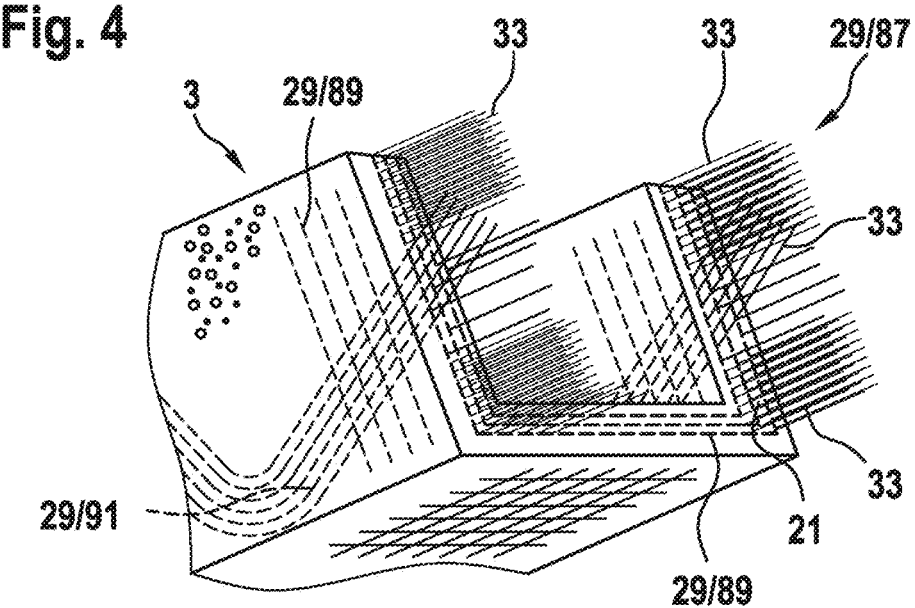
FIG. 4: schematically shows a section of a concrete support structure with wires serving as reinforcement, which were introduced into the concrete mass by a reinforcement feed device of the printer device in accordance with a reinforcement plan.

FIG. 4 shows a section of a concrete support structure 3, on the basis of which the introduction of reinforcement parts 33 is to be better explained. The built-in reinforcement 29 embedded in the processed concrete 21 are different reinforcement wires 87, 89, 91. On the one hand, the reinforcement wires 87 run parallel to the longitudinal extension of the concrete support structure 3. In the orthogonal direction to these reinforcement wires 87, further reinforcement wires 89 are arranged in the concrete support structure 3, which connect the longitudinal reinforcement wires 87 to one another. In order to be able to absorb shear stresses better, reinforcement wires 91 running diagonally during the printing process are introduced into the concrete support structure 3.

Figure 5:
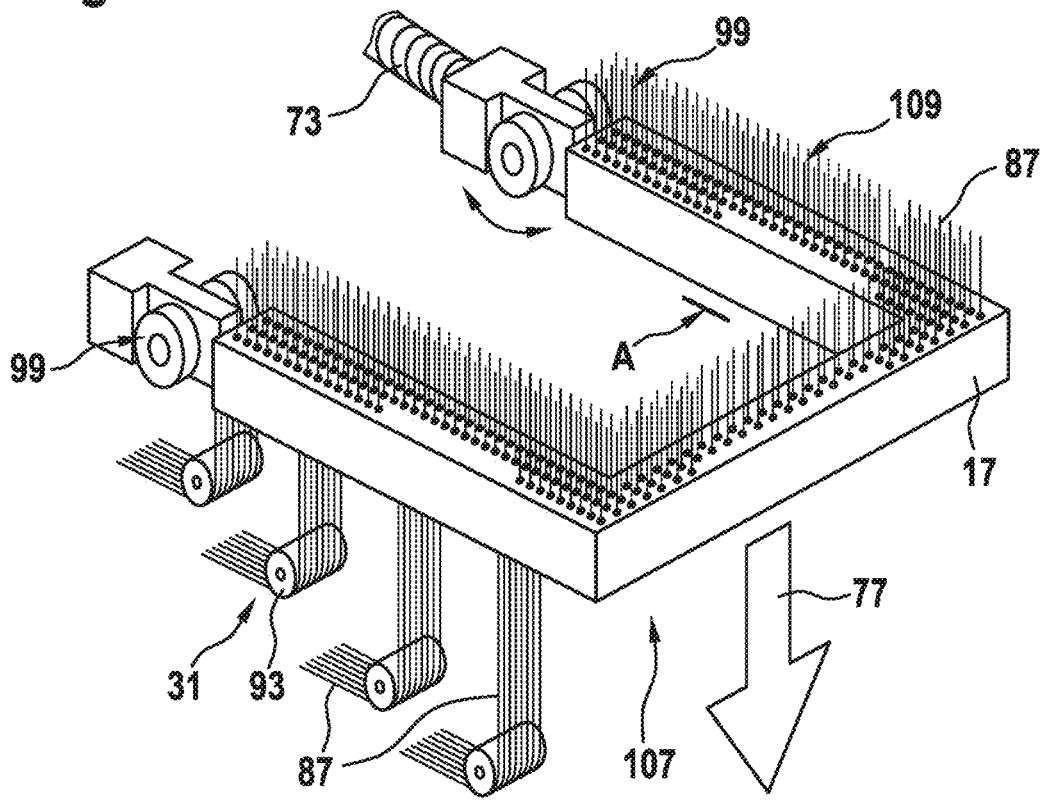
FIG. 5: schematically shows a possible configuration of a nozzle with a reinforcement feed device which feeds reinforcement wires through the nozzle.

In order to produce the concrete support structure 3 shown in FIG. 4, the 3D concrete printer device 15 shown in FIG. 1 can have a printer nozzle 17, as is shown schematically in FIG. 5. The printer nozzle 17 of FIG. 5 is constructed in a U-shape, as a result of which the U-shaped cross section of the concrete support structure 3 is produced. Connected to the U-shaped printer nozzle 17 is a hose from the concrete conveying device 73 through which workable concrete can be fed to the printer nozzle 17. The printer nozzle 17 is pivotally supported by two pivot bearings 99, so that it can be pivoted following the printing process 77 specified by the control software 27 (see FIG. 1).

As shown by way of example in FIG. 4, the reinforcement wires 87, which are to be installed parallel to the longitudinal extension in the concrete support structure 3, are fed through the printer nozzle 17. These reinforcement wires 87 are fed by means of wire guides 93 to the reinforcement feed device 31, which is otherwise not shown. The reinforcement wires 87 protrude through the printer nozzle 17 on their front side 107 and, together with the workable concrete mass supplied by the concrete conveying device 73, emerge from the rear side 109 of the printer nozzle 17 and form the concrete support structure 3 following the printing process 77. Due to the U-shaped configuration of the printer nozzle 17, continuously smooth surfaces can be produced on the resulting concrete support structure 3 during the printing process 77, so that no reworking of the surfaces is required. However, such a configuration of the printer nozzle 17 limits the design freedom of the surfaces and in particular the cross section of the concrete support structure 3.

Figure 6:
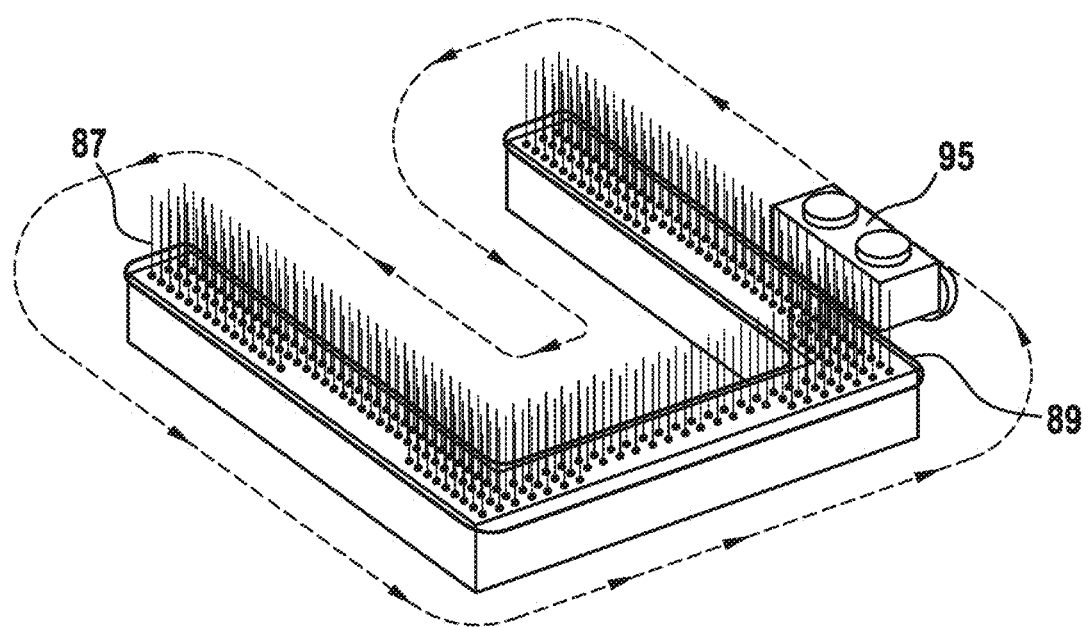
FIG. 6: schematically shows an addition to the reinforcement feed device shown in FIG. 5, so that not only reinforcement wires can be fed in the longitudinal extension of the concrete structure, but also these reinforcement wires laid in the longitudinal direction in the processed concrete mass can connect with other reinforcement wires in the transverse direction.

FIG. 6 schematically shows a possible feed unit 95 for reinforcement wires 89 which are to be arranged orthogonally to the reinforcement wires 87 introduced in the longitudinal direction. Here, the feed unit 95, for example, periodically rotates the U-shaped cross section and winds the reinforcement wire 89 around the reinforcement wires 87 introduced in the longitudinal direction.

Although FIGS. 1 to 6 show different aspects of the present disclosure on the basis of a concrete support structure 3 to be created, which is intended to connect floors E1, E2 spaced apart from one another vertically, it is obvious that the method steps described and a corresponding device are equally usable for those concrete support structures to be arranged on one level, such as those used for moving walkways. In addition, the printer device 1 can have further functional units such as, for example, a device for smoothing surfaces, by means of which the surfaces of the not yet set, processed concrete 21 of the concrete support structure 3 can be processed.

Finally, it should be noted that terms such as "having," "comprising," etc. do not preclude other elements or steps and terms such as "a" or "an" do not preclude a plurality. Furthermore, it should be noted that features or steps that have been described with reference to one of the above exemplary embodiments can also be used in combination with other features or steps of other exemplary embodiments described above. Reference numerals in the claims are not to be interpreted as delimiting.

The invention claimed is:

1. A printer device for creating a concrete supporting structure of a passenger transport system configured as an escalator or moving walkway in an existing building, the printer device comprising:
   a printer guide device which can be arranged between two support points of the building provided for supporting the passenger transport system, wherein the printer guide device is designed to be supported on floors of the building at least during a printing process, which floors shall be connected by the passenger transport system, and
   a 3D concrete printer device which is movably guided along the printer guide device and is configured to spatially arrange workable concrete, the 3D concrete printer device including at least one printer nozzle and at least one movement device for moving the printer nozzle;
   wherein the printer guide device has at least one guideway, the guide path of which can be adjusted, at least in the vertical direction, with respect to its spatial position of use, wherein the printer guide device has a support structure on which the at least one guideway is arranged or formed and the guideway is adjusted by adjusting the support structure, wherein the support structure comprises at least two serially connected sections, the central longitudinal axes of which can be set at an angle to one another.

2. The printer device of claim 1, wherein the guideway is adjustable relative to the support structure.

3. The printer device of claim 1, wherein a fixable hinge point for adjustment is arranged between two sections of the support structure.

4. The printer device of claim 1, wherein at least one angle segment for adjustment is arranged between two sections of the support structure.

5. The printer device of claim 1, wherein at least parts of the printer guide device are provided as reinforcement or part of the reinforcement of the concrete supporting structure.

6. The printer device of claim 5, wherein the part of the printer guide device remaining in the concrete supporting structure has at least one connection point for receiving further reinforcement material.

7. The printer device of claim 1, wherein the printer guide device has at least at one of its two ends a receiving device for bearing components.

8. The printer device of claim 7, the receiving device being movable relative to the printer guide device and being arranged on the latter so that the bearing components accommodated therein can be aligned with a respective bearing point.

9. The printer device of claim 1, further comprising a printer controller, the printer controller comprising a processor and a memory, the memory storing machine readable instructions that, when executed by the processor, cause the processor to carry out a printing process during the creating of the concrete support structure.

* * * * *